Figure 1:
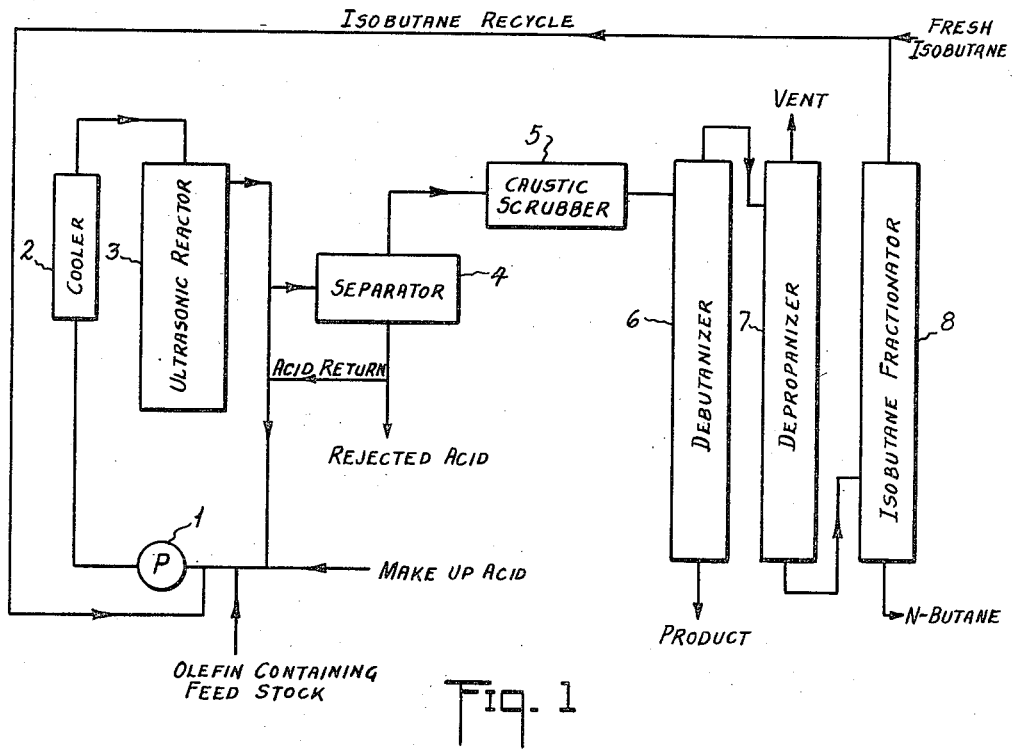

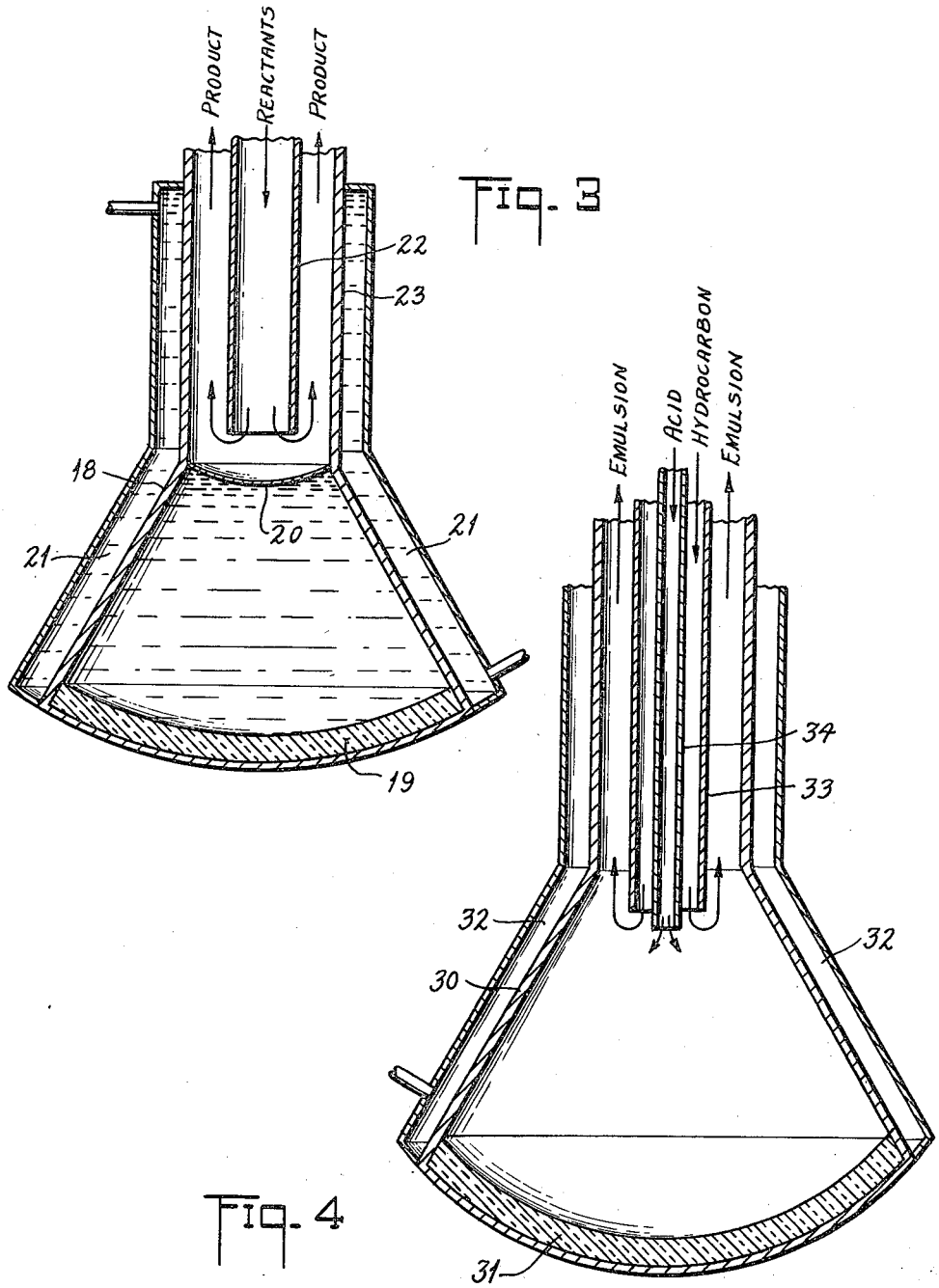

United States Patent Office 2,800,444
Patented July 23, 1957

2,800,444

ALKYLATION PROCESS UTILIZING ULTRASONICS

Everett C. Hughes, Shaker Heights, and Franklin Veatch, Cleveland, Ohio, assignors to The Standard Oil Company, Cleveland, Ohio, a corporation of Ohio Application February 9, 1953, Serial No. 335,884

2 Claims. (Cl. 204—154)

This invention relates to an improvement in the production of high octane number motor fuels by the catalytic alkylation of isoparaffins with olefins, and more particularly to an improvement in the method of agitating the isoparaffin and olefin hydrocarbon phase and the alkylation catalyst phase in the alkylation reaction.

The catalytic alkylation of isoparaffins by olefins is well-known in the art and is practiced to a considerable extent on a commercial scale. The reaction itself is a very simple one. It is typified by the reaction of isobutane and a butylene in the presence of sulfuric acid. In the conventional process, a mixture of the two reactants, with the isoparaffin preferably in large excess, is contacted under vigorous agitation with concentrated sulfuric acid. The reaction product is then separated, the alkylated product being sent to storage while the unreacted isoparaffins are mixed with fresh feed and recycled to the reaction zone. Ordinary room temperatures, or preferably even lower temperatures, are commonly employed, for example temperatures of 70° F. or below, such as 55° F., 35° F. and 0° F. The reaction is conventionally carried out under sufficient pressure to convert the gaseous reactants to the liquid phase.

In the past, various types of reactors have been used. Basically such reactors all operate to provide vigorous agitation of the hydrocarbons and alkylation catalyst. There results from the agitation supplied to the mixture of reactants and sulfuric acid, a dispersion that is often so fine that it may be classed as an emulsion.

As far as is known, ultrasonic vibration has never been applied to the alkylation of isoparaffins with olefins. In accordance with this invention, the application of ultrasonic agitation to the mixture of reactants and sulfuric acid results in several advantages.

One of the problems or disadvantages involved in the alkylation process, as practiced in the prior art, is that of acid contamination. In the known processes, organic material tends to accumulate in the acid phase resulting in undesirable dilution of the acid which necessitates continuous removal of part of the contaminated acid from the system and its replacement by fresh acid. The contamination of acid is noticeably less in the improved method of this invention and, consequently, the amount of fresh acid required is considerably reduced.

Another advantage of the method of this invention is that a smaller volume of acid need be present in the reactor. In the prior art processes, it is customary to employ about one volume of sulfuric acid to one volume of hydrocarbon reactants. In the present process, considerably less acid is required.

A third and important advantage of this invention is that the alkylated product has a different octane isomer distribution which is the result of more highly pronounced branching of the hydrocarbon chains. The desirability of such a result in giving a product of higher octane rating is obvious.

Still another advantage of the invention is that it makes possible the employment of a lower isoparaffin/olefin ratio in the alkylation reaction. This is an important practical advantage because the excess isoparaffin is ordinarily recovered and recycled and as an incident to the recovery, the isoparaffin must first be separated from the normal paraffin which is normally present. This separation is one of the most costly steps in an alkylation process and the cost thereof is proportional to the amount of isoparaffin to be recycled. In this invention, since a lower isoparaffin/olefin ratio is employed, there is consequently less isoparaffin to be recycled.

These and other advantages are realized by the process of this invention which comprises, as an improvement in the art of alkylating isoparaffins with olefins, the step of subjecting the mixture of reactants to ultrasonic vibrations.

Figure 2:
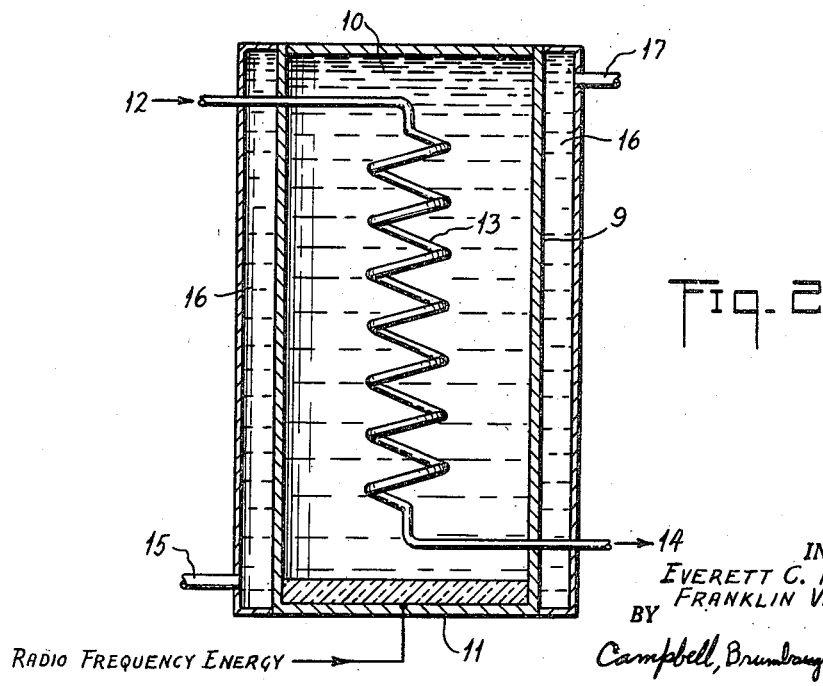

The invention may be better described by referring to the accompanying drawings in which Figure 1 is a flow diagram of a complete alkylation process as practiced according to this invention, and Figures 2, 3 and 4 are schematic representations of reactors employing the process of this invention.

In Figure 1, a mixture including an olefin-containing feed stock, isobutane, and sulfuric acid enters the pump 1 in metered proportions. From the pump, the mixture is passed through cooler 2 and thence into ultrasonic reactor 3. From the reactor, the mixture, which now comprises alkylated product, unreacted hydrocarbons and acid, is passed into the separator 4. In the separator, which may be of any conventional design, for example a centrifugal separator or a gravity type separator, the acid and hydrocarbons are split into two phases, the bulk of the acid being returned to the recycle pump and a portion of the acid being withdrawn from the system.

After leaving the separator, the mixture of product and unreacted hydrocarbons enters caustic scrubber 5 wherein the small amounts of acid remaining in the hydrocarbons is neutralized with alkali. From the caustic scrubber, the hydrocarbons enter the debutanizer 6 wherein the unreacted hydrocarbons are separated from the alkylated products by distillation. The lighter unreacted hydrocarbons thence pass to the depropanizer 7 wherein the C4 or butane hydrocarbons are separated by distillation from propane and lighter hydrocarbons. The butane fraction is then transferred to isobutane fractionator 8 wherein n-butane is separated from isobutane. The recovered isobutane is recycled along with fresh isobutane to the beginning of the system.

The schematic representation of the ultrasonic reactor in Figure 2 is illustrative of one method by which this invention may utilize ultrasonic agitation. The reactor 9 is essentially a closed vessel, the interior of which is completely filled with a mineral oil 10 and the exterior of which is jacketed to provide for a means of cooling the vessel. At the bottom of the reactor, there is shown a transducer 11 which is connected to a source of radio frequency energy. The source of radio frequency energy may be an oscillator such as is frequently employed in radio work and which is well known in the art. The transducer may be any material capable of converting electrical energy into ultrasonic vibrations such as, for instance, a quartz crystal or, preferably, a ceramic element. Devices known as magnetostrictors may also be employed. Such elements are well known in the art, and the selection of a suitable transducer and the installation of the same is within the skill of the art.

The reactants and sulfuric acid enter the reactor at 12 and travel by way of a closed coil 13 through which the ultrasonic vibrations pass, leaving the reactor through line 14. At the same time that the reaction is being performed, a cooling medium is introduced at 15 and travels through jacket 16, leaving the jacket through line 17.

In operation, the ultrasonic vibrations produced in the transducer 11 are imparted to the oil 10, which in turn acts as a transfer medium by which the ultrasonic vibrations are conducted to the mixture of reactants and sulfuric acid within coil 13. By virtue of the ultrasonic vibrations, there is formed within coil 13 a fine emulsion of the reactants and sulfuric acid. The alkylation of the isoparaffin with the olefin proceeds exothermically and almost instantaneously so that the passage of reactants through the coil may be quite rapid. The provision for cooling the oil within the reactor is necessary for two reasons. First, the reaction itself is exothermic and evolves a considerable amount of heat, and second, the ultrasonic vibrations produced by the transducer 11 result in the formation of heat in the oil and in the mixture of reactants and sulfuric acid. In the embodiment of the process shown in Figure 2, the oil which is cooled by the cooling jacket will act as a cooling medium for the reaction mixture.

In the embodiment shown in Figure 3, the operation is similar to that of the reactor of Figure 2. In Figure 3, 18 represents a vessel of strong construction, the interior of which is filled with oil under pressure. In the bottom of the vessel is shown transducer 19. The top of the vessel is sealed by a sound transparent diaphragm 20 which may be of metal, glass or other suitable material. The vessel is cooled by a cooling jacket 21 which surrounds the vessel. The mixture of reactants and sulfuric acid is brought into contact with the sound transparent diaphragm 20 by being forced under pressure through tube 22 located inside of column 23, and terminating short of the sound transparent diaphragm. The reactants leaving tube 22 leave the reactor through column 23 as indicated on the drawing. The exterior of column 23 is cooled by a jacket through which may be circulated a suitable cooling medium. It is to be noted that in this reactor the transducer 19 is shaped in concave fashion so that the energy transmitted therefrom is focused on the sound transparent diaphragm.

In another modification of the invention, the reactants and catalyst can be contacted directly with the transducer instead of employing a conductive medium such as oil. Generally, this modification is not as desirable because of the danger of electrical or mechanical damage to the system. The modification is illustrated in Figure 4 wherein 30 represents a reactor, 31 represents a transducer having an acid resistant coating, and 32 represents a cooling jacket. In the upper interior of the reactor are located two concentric feed pipes 33 and 34. The transducer is so designed that the energy output is focused at the exit of pipe 34.

In the operation of the reactor of Figure 4, acid is introduced into pipe 34 and the hydrocarbon reactants introduced into the reactor via pipe 33 under pressure. As the acid initially contacts the reactants at the exit of pipe 34, the ultrasonic energy focused at this point results in quick emulsification and reaction. By maintaining a continual inflow of acid and hydrocarbons, a flow of alkylated product can be drawn off through the annular space between pipe 33 and the wall of the reactor.

The reaction time obtainable by the present process is, of course, subject to many considerations such as the type of apparatus and the reaction conditions. However, it is possible to employ residence times within the reactor that are considerably less than the residence times necessary when utilizing only mechanical agitation. Residence times as low as 2 to 3 minutes can be employed by the utilization of ultrasonic agitation and it is possible that even shorter times can be employed.

Another modification of the process of this invention includes the pre-mixing of the reactants and catalyst prior to their introduction into the ultrasonic reactor. Thus a preliminary coarse dispersion of the materials can be effected by, for example, a continuous turbo-mixer. In this manner, an even shorter residence time within the reactor can be achieved and the formation of a fine emulsion within the reactor is assured.

The frequency of the ultrasonic vibrations employed in the process of this invention is not critical and is largely a matter of convenience. The frequency to be employed in each given instance will vary with the size and structure of the reaction vessel, the rate of flow of reactants and catalyst, and the means available for separating the reaction products from the catalyst at the termination of the reaction. Generally, the frequency is so adjusted that as "tight" an emulsion as possible is formed without forming such a "tight" emulsion that later separation is unduly difficult. Thus, if centrifuges or other similar equipment are available for separating the emulsion at the end of the reaction, "tighter" emulsions may be formed than if only settling tanks are available for separation. Also, if longer settling tanks are available, and the hold-up due to prolonged settling is not objectionable, a longer settling time can be used to obtain separation of a "tight" emulsion. The frequency employed and the extent of the emulsification must be balanced against the separation facilities and techniques available and the properties wanted in the final product. Generally, the frequencies employed are within the range of 100 to 1,000 kilocycles per second. A preferred range is from about 300 to 500 kilocycles per second.

The improved process of this invention is applicable to any process in which an isoparaffin is alkylated with an olefin in the liquid phase in the presence of an alkylation catalyst. While the invention has been specifically described with respect to the alkylation of isobutane in the presence of sulfuric acid as a catalyst, it is also applicable to processes in which other isoparaffins such as isopentane are alkylated. Similarly, while sulfuric acid is the preferred alkylation catalyst, it is possible to employ other liquid alkylation catalysts such as hydrogen fluoride and halosulfonic acids.

The olefinic feed stock is preferably one containing a predominant amount of butenes although it may contain, in addition, smaller quantities of various propenes, pentenes or other unsaturated hydrocarbons.

The temperature maintained in the alkylation reactor may vary widely, for example from 0° F. up to about 90° F., although it is preferred to maintain a temperature between about 35° F. and 45° F. The pressure should be correlated with the temperature to provide conditions under which the reactants are in the liquid state.

The proportions of olefin, isoparaffin, and alkylation catalyst are generally in keeping with the conventional processes known in the art with the exception that it is possible to employ a smaller quantity of alkylation catalyst in the improved process described herein. The isoparaffin component of the reaction mixture is preferably in large excess over the olefinic component. However, instead of employing a ratio of approximately one volume of hydrocarbon reactants to one volume of alkylation catalyst, as is conventional in the art, it has been found that about 5 to 50% less acid is required in the process of this invention. This may be expressed as 50 to 95 parts of acid per 100 parts of hydrocarbon reactants by volume. In addition to this saving in the amount of acid required, it is also possible to recirculate a greater portion of the alkylation catalyst than is customary because of the fact that there occurs less contamination of the catalyst.

The several advantages which result in the practice of this invention cannot be explained categorically in the light of present knowledge. However, it is believed that application of ultrasonic agitation to the alkylation reaction makes it possible to achieve a much "tighter" emulsion, i. e. an emulsion in which the dispersed droplets are of a smaller particle size than the emulsions obtained in the prior art. It is also believed that the reaction is a surface phenomenon which takes place at the interface between the acid and hydrocarbons, and it is believed that, because of the tightness of the emulsion, less acid is required to achieve the same degree of contact between hydrocarbons and acid that is attained in the previously known processes. Also, because of the fact that the acid droplets in the emulsion are smaller, it is believed that there occurs a much smaller amount of rupture of the acid droplets with the consequent entry of hydrocarbon into the acid droplets. Thus, less contamination of the acid results.

It is intended to cover all changes and modifications in the examples of this invention herein given for purposes of illustration which do not constitute departure from the spirit and scope of the appended claims.

We claim:

1. In a process of alkylation where isoparaffin and olefin hydrocarbons are reacted in the presence of a concentrated sulfuric acid alkylation catalyst to form alkylate under pressure to maintain the hydrocarbons in the liquid phase, the improvement which comprises flowing a mixture of said isoparaffin and olefin hydrocarbons together with said alkylation catalyst in a ratio of 50 to 95 parts of acid catalyst per hundred parts of hydrocarbon by volume under alkylating conditions including cooling through an ultrasonic reactor in which process the mixture is subjected to ultrasonic vibrations at a frequency of 100 to 1000 kilocyles per second, in which the ultrasonic vibrations are the sole emulsifying agency in the ultrasonic reactor, and in which the residence time in the ultrasonic reactor is not over three minutes, whereby there is effected an intimate but breakable emulsion of the hydrocarbon reactants and the catalyst, and thereafter breaking the emulsion and recovering the alkylate.

2. The process of claim 1 in which the isoparaffin is isobutane and the olefin is a butylene.

References Cited in the file of this patent

UNITED STATES PATENTS

| | | |
|---|---|---|
| 1,992,938 | Chambers | Mar. 5, 1935 |
| 2,428,506 | Van der Volk | Oct. 7, 1947 |
| 2,474,924 | Watson et al. | July 5, 1949 |
| 2,742,408 | La Porte | Apr. 17, 1956 |

FOREIGN PATENTS

| | | |
|---|---|---|
| 444,526 | Great Britain | Mar. 23, 1936 |
| 554,872 | Great Britain | July 22, 1943 |

OTHER REFERENCES

Petroleum Refinery Eng. by W. E. Nelson, 3rd ed. (1949), McGraw-Hill Book Co., N. Y., pp. 656–660.

Chemical Eng. Progress, vol. 46 (1950), pp. 3–6, by Thompson.

Ultrasonics, two symposia by American Inst. of Chem. Eng. (1951), N. Y., pp. 22–27, 53.